United States Patent
Zimmerman et al.

(10) Patent No.: US 7,907,293 B2
(45) Date of Patent: Mar. 15, 2011

(54) PRINTER FORMATTER IN A REMOVABLE CARD

(75) Inventors: Gary D Zimmerman, Boise, ID (US);
Mark D Montierth, Meridian, ID (US);
Richard D Taylor, Eagle, ID (US)

(73) Assignee: Marvell International Technology Ltd. (BM)

( * ) Notice: Subject to any disclaimer, the term of this patent is extended or adjusted under 35 U.S.C. 154(b) by 650 days.

(21) Appl. No.: 11/846,492

(22) Filed: Aug. 28, 2007

(65) Prior Publication Data

US 2009/0009792 A1    Jan. 8, 2009

Related U.S. Application Data

(62) Division of application No. 09/675,920, filed on Sep. 29, 2000, now Pat. No. 7,301,655.

(51) Int. Cl.
*G06F 3/12* (2006.01)
*G06K 15/00* (2006.01)

(52) U.S. Cl. .................. 358/1.13; 358/1.15; 358/1.16

(58) Field of Classification Search .............. 358/1.1, 358/1.9, 1.11–1.18
See application file for complete search history.

(56) References Cited

U.S. PATENT DOCUMENTS

| | | | |
|---|---|---|---|
| 4,316,720 A | 2/1982 | Ackerman | |
| 5,930,553 A * | 7/1999 | Hirst et al. | 399/8 |
| 6,113,208 A | 9/2000 | Benjamin et al. | |
| 6,333,790 B1 | 12/2001 | Kageyama | |
| 6,426,801 B1 | 7/2002 | Reed | |
| 6,438,643 B1 | 8/2002 | Ohara et al. | |
| 6,538,687 B1 | 3/2003 | Saito et al. | |
| 6,538,762 B1 | 3/2003 | Terashima et al. | |
| 6,587,140 B2 * | 7/2003 | No | 348/207.2 |
| 6,606,161 B2 | 8/2003 | Murata | |
| 6,665,089 B1 * | 12/2003 | Austin et al. | 358/1.18 |
| 6,801,328 B2 | 10/2004 | Tsukamoto et al. | |
| 7,301,655 B1 | 11/2007 | Zimmerman et al. | |
| 2003/0016376 A1 * | 1/2003 | Narushima | 358/1.13 |

* cited by examiner

*Primary Examiner* — Thierry L Pham

(57) ABSTRACT

A method and system for integrating a printer controller with a PC card. This system includes an office machine and a removable PC card that can be operationally coupled with the office machine. The office machine has a rendering engine for rendering images and a PC card slot for operationally coupling to a removable PC card and for receiving print engine ready data (PERD). The PC card slot is coupled to the print engine for providing the PERD thereto. The PC card has a printer formatter for receiving printer formatter ready data and for converting it into PERD and providing printer formatter functions. When the PC card is operationally coupled to the PC card slot, the print engine ready data can be selectively transferred from the PC card to the office machine.

22 Claims, 6 Drawing Sheets

PRINTER FORMATTER IN A REMOVABLE CARD

This application is a divisional application of U.S. Ser. No. 09/675,920, filed Sep. 29, 2000, herein incorporated by reference in its entirety.

FIELD OF THE INVENTION

The present invention relates generally to imaging peripherals, and more specifically, to a printer formatter in a removable card.

BACKGROUND OF THE INVENTION

The market for computer peripherals is highly competitive. In these markets, a large volume of sales is needed in order to be profitable since typically there is a low per product profit margin In order to obtain a reasonable return on investment, the cost to manufacture the product must be kept low relative to the price of the product. Consequently, the successful manufacture and sale of computer peripherals often depend on reducing production costs and shortening the time-to-market of the products.

In the manufacture of computer peripherals, there are often many components and sub-assemblies that require testing and integration with other components and sub-assemblies. This process, which is generally known as system integration, is further complicated by the fact that these components and sub-assemblies are often manufactured by different parties.

For example, in the laser printer market, one party typically manufactures the print engine and a another party is responsible for manufacturing the printer formatter that provides formatting functions to the print engine.

Furthermore, one sub-assembly cannot be completed until all components for that sub-assembly have been received and proper operation is verified with the other components. For example, since the printer formatter is integrated with the print engine, the manufacturer of the printer formatter has a shortened development time. The development time is shortened since the print engine manufacturer requires sufficient time to integrate the printer formatter with the print engine and to verify the proper operation of the printer formatter with the components of the print engine.

As can be appreciated, there are many costs and time consuming steps that are involved in system integration. Accordingly, manufacturers are constantly attempting to find ways to reduce costs and improve the efficiency of the above-described process.

FIG. 8 illustrates a block diagram of a conventional laser printer 1100. It is noted that the printer 1100 includes a printer controller 1104 that is coupled to a print engine 1108. The printer controller is also coupled to a printer controller interface 1118 for connecting a cable 1114 to the printer controller 1104. Since the printer controller 1104 is housed within the enclosure of the printer 1100, it is apparent that repairing or updating the printer controller 1104 is a complex and costly procedure that is not accessible to the average computer user. It would be desirable for a mechanism that allows the user to be able to easily access, configure, and upgrade the formatter. Unfortunately, this is not possible with prior art printer system configurations.

Manufacturers of laser printers have typically focused their efforts at reducing costs by employing one of two different approaches. Unfortunately, these approaches, as will be described hereinafter, offer only minimal improvements, often inject inefficiencies in other areas, which often negate any improvements gained by the approach, and do not address the inefficiencies of the current upgrade solution.

The first prior art approach is to super-integrate die components of the printer formatter. This approach can reduce system costs. However, if the super-integrated chip is designed onto an embedded formatter (i.e., a formatter embedded into the print engine), then the development schedule for the formatter chip is shortened by the manufacturing lead-time of the print engine.

Additionally, it is difficult to integrate all the functional blocks of the formatter (e.g., the processor, RAM, ROM, and interface) into a single integrated circuit. Typically, it is the size of the ROM and RAM that is the limiting factor. Accordingly, it is desirable to have a mechanism to reduce the amount of code that needs to be stored in the memory, so that a higher level of integration can be achieved.

Second, upgrades in formatter functionality are difficult and costly to perform by the print engine manufacturer. For example, if a user desires a new functionality, since the formatter is within the printer enclosure, and it is not easily accessible to the user, the users' options are very limited.

The first option is to buy a new printer with a new formatter integrated circuit having the new function. The second option is to send the printer to the print engine manufacturer, who in turn installs a new formatter integrated circuit in the printer and ensures compatibility with the print engine. Even then, the print engine manufacturer often times needs to perform extensive re-work on the printer to install the new formatter. As can be appreciated, this upgrade solution is not very efficient and relatively costly.

Another attempt to reduce costs and increase efficiency is to integrate the printer formatter with other electronics internal to the printer. These electronics can include the laser controller, which is commonly referred to as the "DC controller." Unfortunately, this approach suffers from several disadvantages.

First, although this approach reduces costs, the approach also can increase costs of developing and testing the DC controller because the printed circuit board technology is not robust enough for the digital printer formatter.

Second, the components of a laser printer are highly dependent on each other. For example, the DC controller, the laser print engine, and the digital printer formatter are connected together in a particular format and are dependent upon each other. Consequently, the printer formatter cannot be replaced without requiring corresponding changes to the other components.

Based on the foregoing, it is desirable to provide a printer formatter that is external to the printer enclosure, easily removable, easily configurable, and that overcomes the disadvantages discussed above.

SUMMARY OF THE INVENTION

A method and system for integrating a printer controller with a PC card. This system includes an office machine and a removable PC card that can be operationally coupled with the office machine. The office machine has a rendering engine (e.g., a print engine) for rendering images (e.g., printing text or images) and a PC card slot for operationally coupling to a removable PC card and for receiving print engine ready data (PERD). The PC card slot is coupled to the print engine for providing the PERD thereto. The PC card has a printer formatter for receiving printer formatter ready data and for converting it into PERD and providing printer formatter functions. When the PC card is operationally coupled to the PC card slot, the print engine ready data can be selectively transferred from the PC card to the office machine.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A PC card printer formatter and a method of using the same are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary Computer System 10

Figure 1:
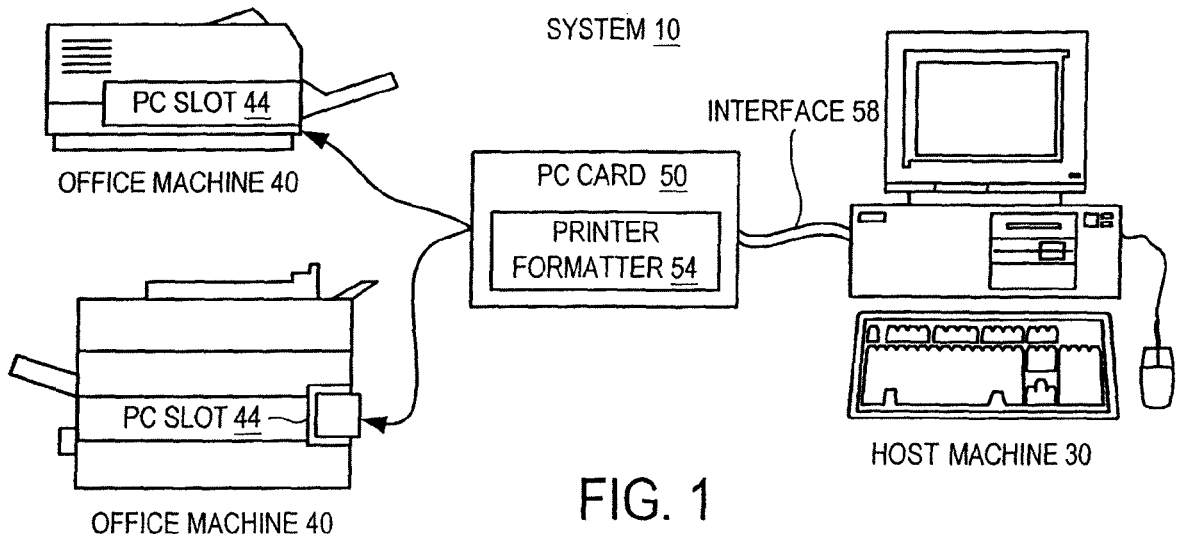
FIG. 1 is a block diagram of a computer system in which the PC card printer formatter of the present invention can be implemented.

FIG. 1 is a block diagram of a computer system 10 in which the printer formatter PC card of the present invention can be implemented. The system 10 includes a host machine 30 (e.g., a personal computer (PC)) that requires one or more services (e.g., printing services) and one or more office machines 40 (e.g., a first printer and a second printer). The office machine 40 includes a slot 44 (also referred to as a PC slot) for receiving a removable PC card 50. The slot 44 includes a print engine ready data (PERD) interface for receiving print engine ready data. As described in greater detail hereinafter, the PERD can be selectively provided by a printer formatter (also referred to herein as a printer controller) that is implemented in the PC card 50.

The PC card 50 is removably coupled to the slot 44 in the office machine 40. One aspect of the present invention is the provision of a printer formatter 54 in the removable PC card 50, which is hereinafter referred to also as printer formatter PC card 50 or simply as formatter card 50. For example, the form factor of the PC card 50 can be the form factor of the Personal Computer Memory Card International Association (PCMCIA) type I, type II, or type III card, of a compact FLASH card, or other removable media formats. In other embodiments, the removable PC card can have the industrial design of a PCI card or ISA card.

It is noted that in a preferred embodiment, the PC card 50 has an interface 58 (e.g., a cable) that directly couples to the host machine 30 as shown in FIG. 1. Alternatively, the printer formatter PC card 50 may not have such an interface that couples directly to the host machine. In this alternative arrangement, a standard printer cable (not shown) is also needed. The host machine 30 can then utilize the standard printer cable to initialize, configure, or otherwise communicate with the printer formatter 54.

By separating the printer formatter 54 from the office machine 40 and its physical enclosure and integrating the printer formatter 54 into a unitary PC card 50, the printer formatter 54 can advantageously leverage the robust PC card manufacturing processing. Additionally, since PC cards are easy to use and generally familiar to users in other contexts, such as modem PC cards, network PC cards, and hard disk drive PC cards, the printer formatter 54 can now be installed and upgraded by the user without costly intervention by the printer engine manufacturer. As described in greater detail hereinafter, the present invention provides a printer formatter 54 having a simple repair strategy, an easy upgrade solution, lower product costs, and a shorter time-to-market.

Figure 2:
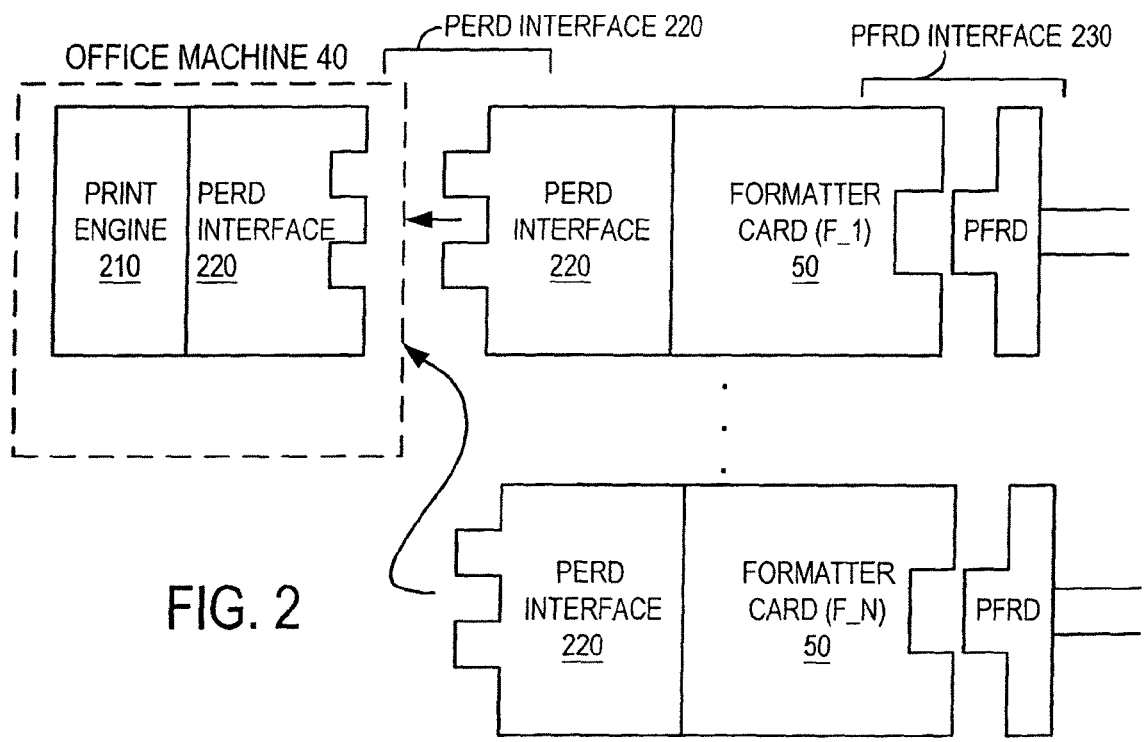
FIG. 2 is a block diagram illustrating in greater detail the interface between the printer engine and the PC card printer formatter configured in accordance with one embodiment of the present invention.

FIG. 2 is a block diagram illustrating in greater detail the interface 220 between the printer engine 210 and the printer formatter PC card 50 and the interface 230 between the printer formatter PC card 50 and the office machine 40 in accordance with one embodiment of the present invention.

The office machine 40 includes a rendering engine, which can be a print engine 210 for printing text or other images. The print engine 210 can communicate with the printer formatter 54 when the PC card 50 is inserted into the slot 44. The print engine 210 communicates with the printer formatter 54 via a print engine ready data (PERD) interface 220.

In like manner, the PC cards 50 can communicate with the host machine 30 via a print formatter ready data (PFRD) interface 230 when the PC card 50 is coupled to the host machine 30. It is noted that multiple PC card formatters 50 (e.g., F_1 to F_N) can be developed and used with the same print engine 210. The present invention provides a printer formatter solution having a PERD interface 220 and PFRD interface 230 that can be flexibly coupled to the print engine 210 and the host machine 30, respectively.

The PERD interface 220 can be any industry standard computer port interface or a custom interface. The PFRD interface 230 can be any industry standard computer port interface that can be, but is not limited to an IEEE 1284 parallel port interface, a USB serial port interface, and an Ethernet interface.

PC Card 50

Figure 3:
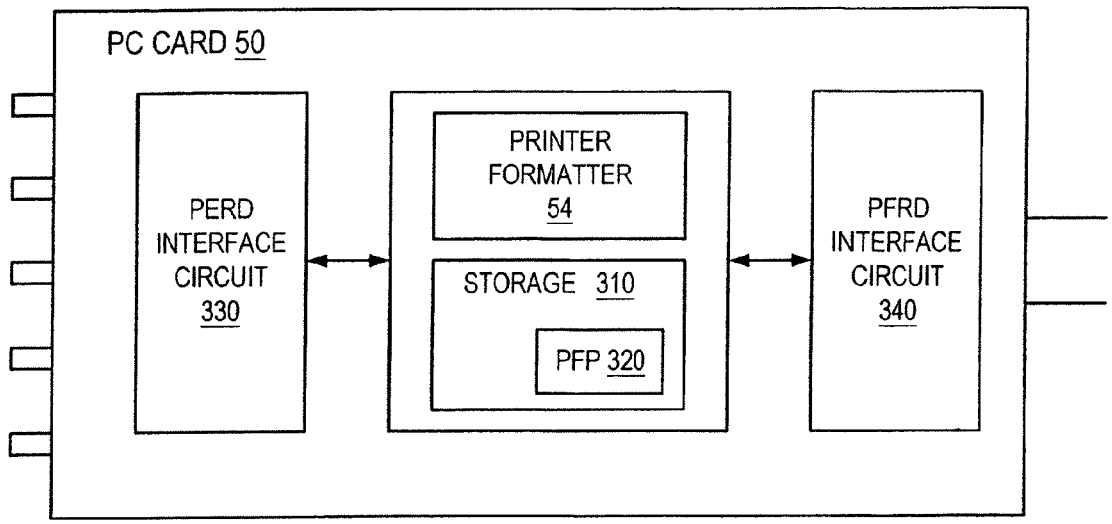
FIG. 3 is a block diagram illustrating in greater detail the PC printer formatter of FIG. 1 configured in accordance with one embodiment of the present invention.

FIG. 3 is a block diagram illustrating in greater detail the PC card 50 having the printer formatter 54 of FIG. 1 configured in accordance with one embodiment of the present invention. The PC card 50 includes a printer formatter integrated circuit 54, a memory 310 for storing information (e.g., the printer formatter program (PFP) 320), a PERD interface circuit 330 for managing the communications on the PERD interface, and a PFRD interface circuit 340 for managing the communications on the PFRD interface. Preferably, the printer formatter integrated circuit 54 is implemented as an application specific integrated circuit (ASIC), and the memory 310 is implemented as a random access memory (RAM).

Figure 4:
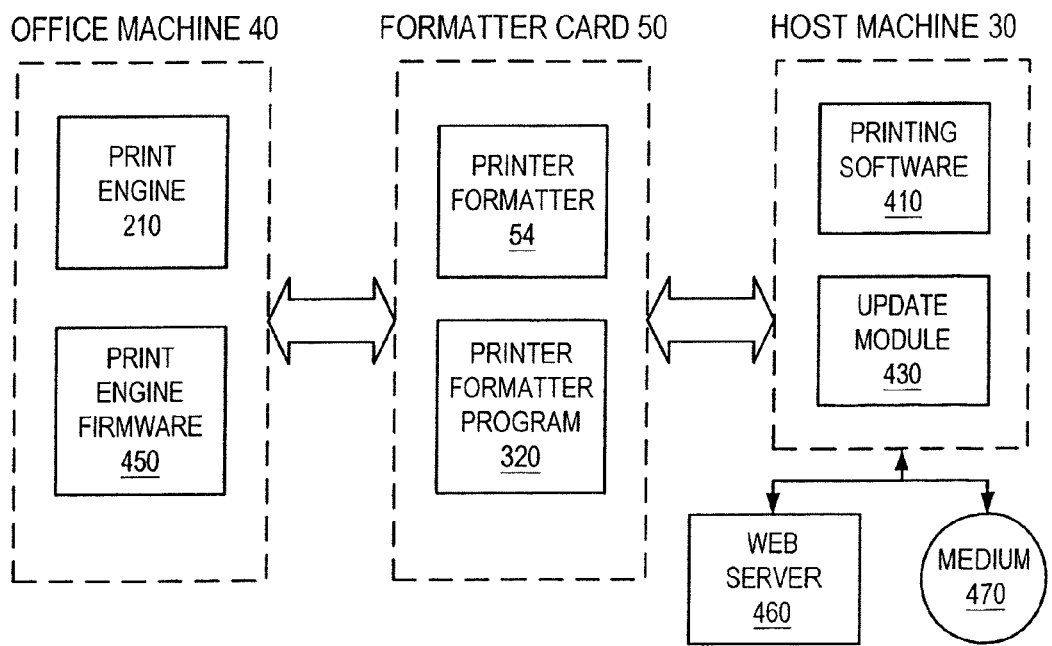
FIG. 4 is a block diagram illustrating key components of FIG. 1 that are configured in accordance with one embodiment of the present invention.

FIG. 4 is a block diagram illustrating key components of FIG. 1 that are configured in accordance with one embodiment of the present invention. As described earlier, the system 10 includes an office machine 40, a host machine 30, and a removable formatter PC card 50 that is coupled to the host 30 and the office machine 40. Printing software 410 for controlling the printing process and print jobs preferably runs on the host machine 30. An update module 430, which is described in greater detail hereinafter with reference to FIG. 7, preferably also resides on the host machine 30.

The formatter card 50 includes the printer formatter 54 and printer formatter software 320 that runs on the printer formatter 54. Initially, printer formatter program 320 (commonly referred to as printer formatter firmware) can reside in memory on the host machine 30 for downloading to the storage 310 of the formatter card 50 when needed.

It is noted that the printing software 410 and printer formatter software 320 (originals or upgrades) can be provided via a computer readable medium 470 (e.g., a compact disc) or downloaded from a web server 460 (e.g., an Internet web site) that is distributed from the host machine 30.

The office machine 40 includes the print engine 210 and print engine firmware 450 that is executed by the print engine 210. The print engine firmware 450 is well-known by those of ordinary skill in the art and is not described in greater detail hereinafter.

Method of Using the Printer Formatter PC Card

Figure 5:
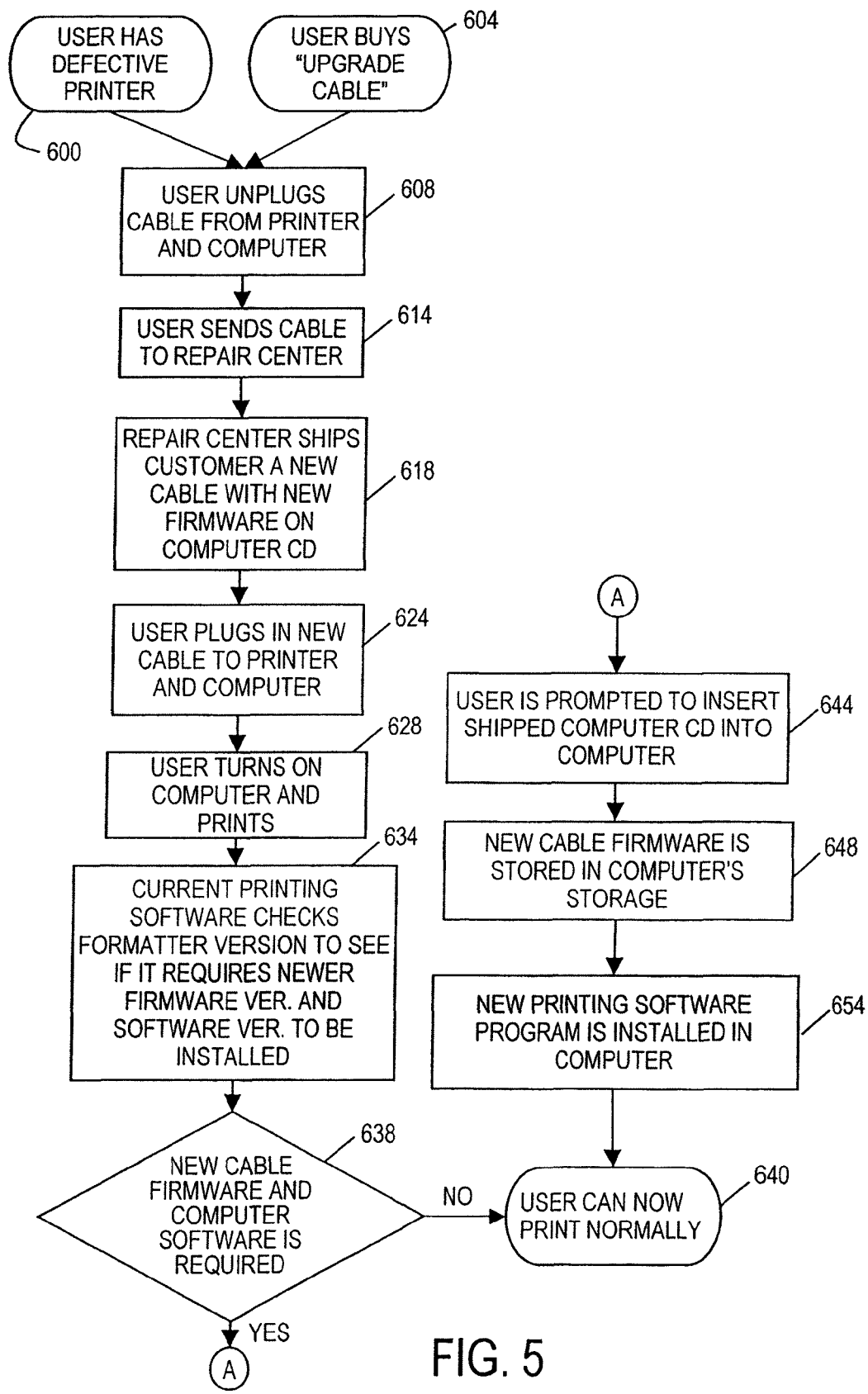
FIG. 5 is a flow chart illustrating the steps performed by a user to replace the card and printer controller in accordance with one embodiment of the present invention.

FIG. 5 is a flow chart illustrating the steps performed by a user to replace the PC card 50 in accordance with one embodiment of the present invention. The steps described herein are applicable whenever a new PC card is needed. For example, a user can purchases an "upgrade" PC card, or a user can send a defective PC card for repair.

In step 600, a user determines that a current printer formatter is defective. Alternatively, a user in step 604 determines that an upgrade in printer formatter capabilities is needed. In step 608, a user removes the PC card 50 from the office machine 40 and the host 30. In step 614, the user sends the PC card 50 to a repair center. In step 618, the repair center sends to the customer a new PC card 50 and computer media (e.g., a compact disc) having loaded thereon new firmware (e.g., a new version of the printer formatter program 320). Alternatively, if the user purchases an "upgrade" PC card, steps 608 and 614 can be replaced with the steps of discarding the current PC card 50 and purchasing a new PC card with computer media having new firmware loaded thereon.

In step 624, the user inserts the new (or repaired) PC card 50 to the slot 44 of the office machine 40 and also connects the PC card 50 to the host 30. In step 628, the user turns on the host 30 and prints a document. In step 634, current printing software 410 checks the formatter version to determine if a newer version of the printer formatter program 320 and a newer version of the printer software 410 need to be installed.

In decision block 638, a determination is made whether a newer version of the printer formatter program 320 or a newer version of the printer software 410 is needed. If no, then the user can print (step 640).

If a newer version of the printer formatter program 320 or a newer version of the printer software 410 is needed, then the user is prompted to insert the computer media (e.g., compact disc) into the host 30 (step 644). In step 648, a new printer formatter program 320 is stored in the storage (e.g., non-volatile 516) of the host 30. In step 654, a new printer software 410 is installed in the host 30. Processing then proceeds to step 640, where a user can print. The print process in accordance with one embodiment of the present invention is described in hereinafter with reference to FIG. 6.

Printer Software Operation

Figure 6:
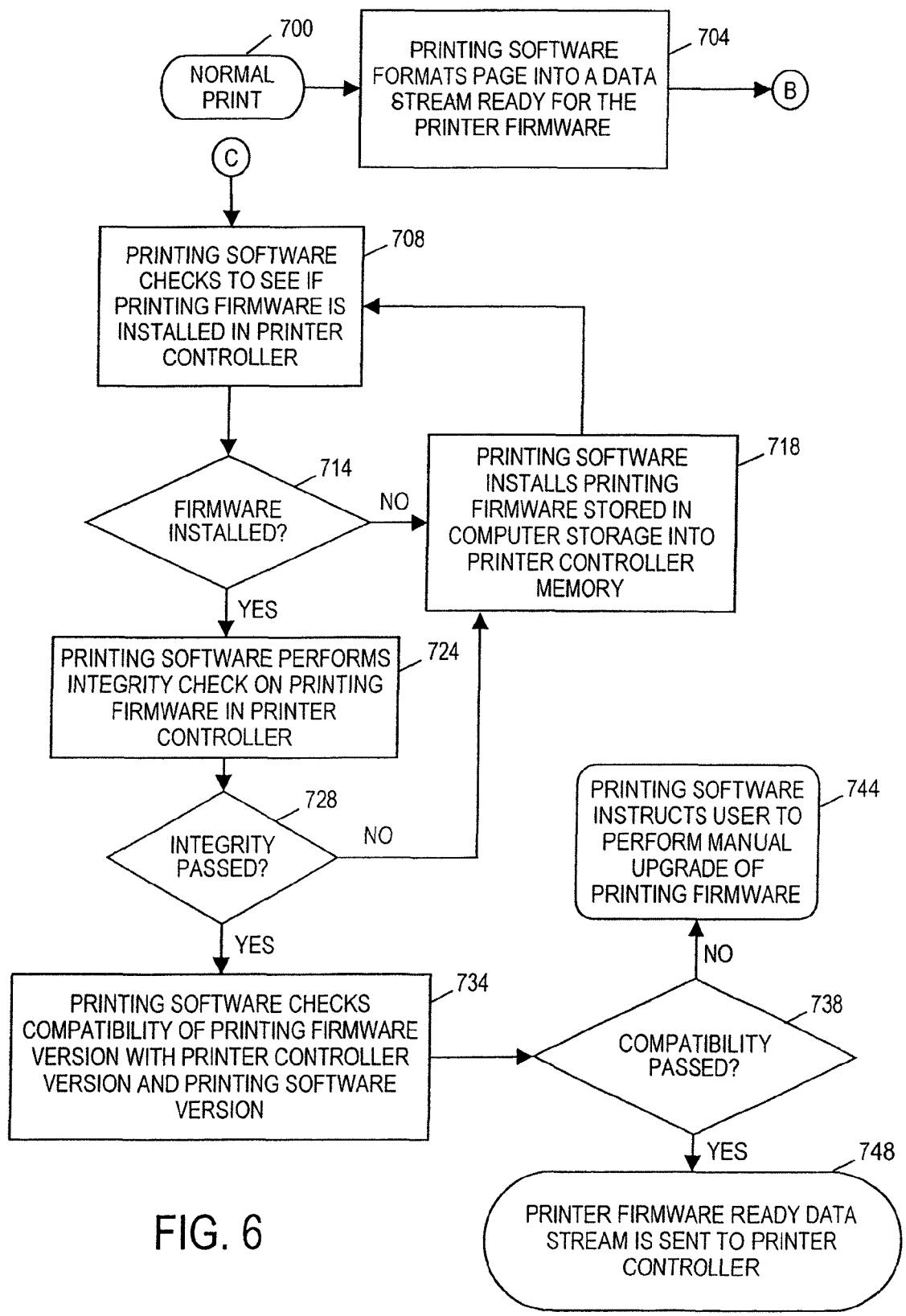
FIG. 6 is a flow chart illustrating the steps performed by the printing software of the system of FIG. 4 in accordance with one embodiment of the present invention.

FIG. 6 is a flow chart illustrating the steps performed by the printing software of the system of FIG. 4 in accordance with one embodiment of the present invention. In step 700, normal printing is initiated by the user. Printing can be initiated by a user selecting a print button in an application (e.g., a word processing document). In step 704, the printing software 410 formats a page into a data stream that is ready for the printer formatter 54. Processing then proceeds to step 854 of FIG. 7.

Figure 7:
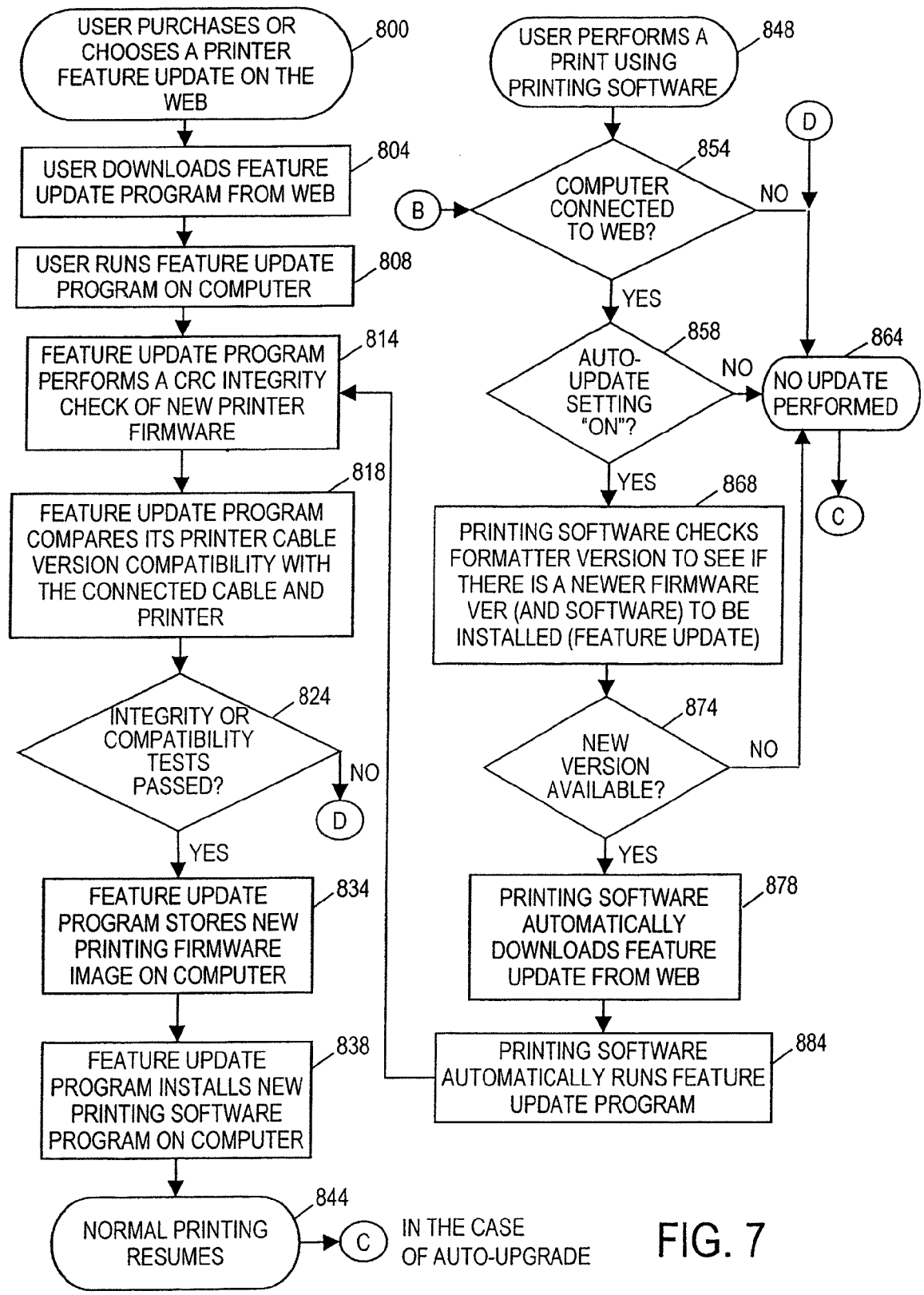
FIG. 7 is a flow chart illustrating the steps performed by the upgrade module of the system of FIG. 4 in accordance with one embodiment of the present invention.
Figure 8:
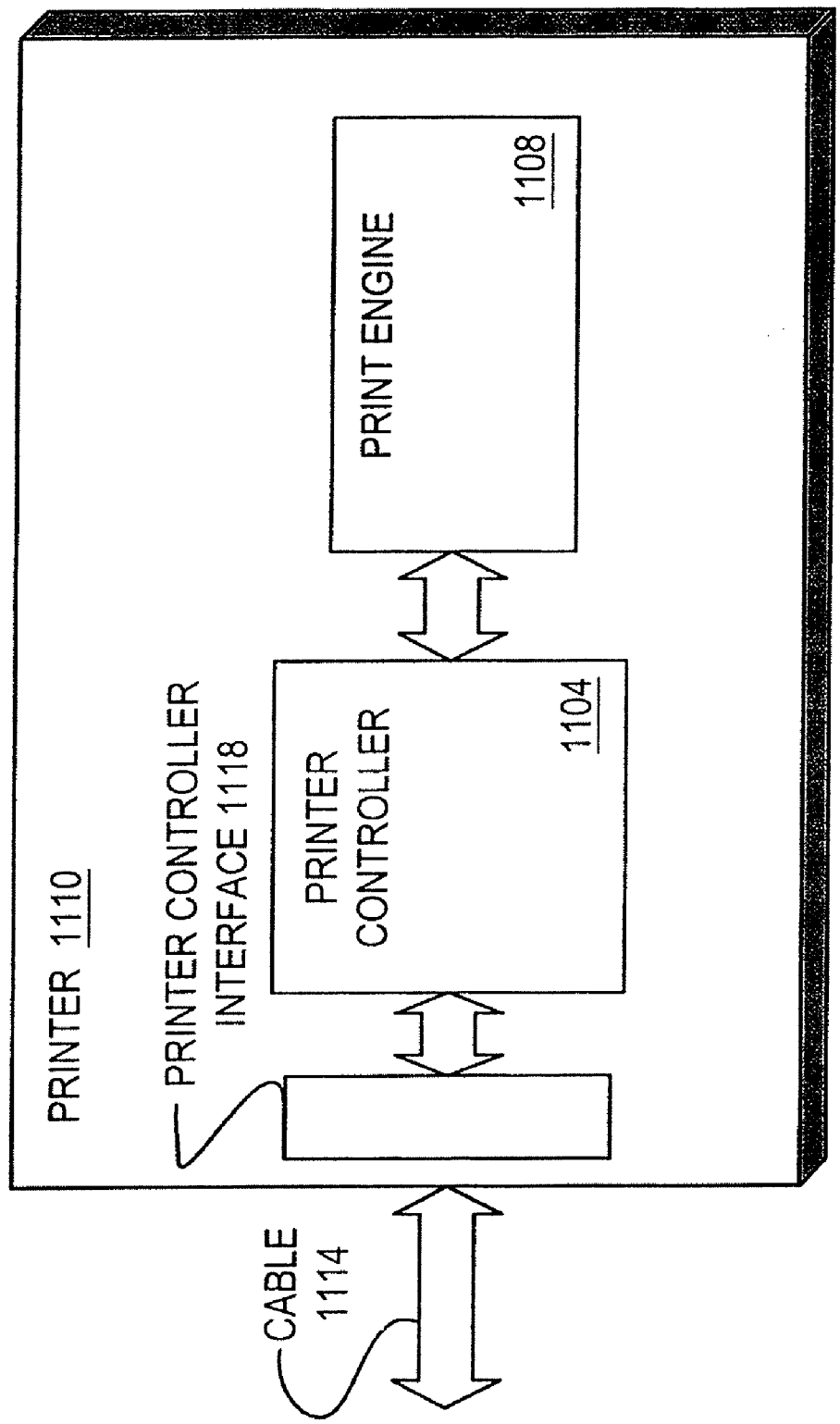
FIG. 8 illustrates a block diagram of a conventional laser printer.

After the processing that occurs in FIG. 8, processing returns to step 708 of FIG. 7 from step 844 or step 864 of FIG. 8. In step 708, the printing software 410 checks to determine if the printer formatter program 320 is installed in the printer formatter 54. In decision block 714, if the printer formatter program 320 is installed, then processing proceeds to step 724. Otherwise, processing continues at step 718. In step 718, the printing software 410 installs the printer formatter program 320 that is stored in the storage of the host 30 into the storage (e.g., RAM of the printer formatter).

In step 724, the printing software 410 performs an integrity check on the printer formatter program 320 in the printer formatter 54. The integrity check is for determining whether the bits in the printer formatter program 320 has been corrupted and can be a cyclic redundancy check (CRC) that is well known by those of ordinary skill in the art. In decision block 728, a determination is made whether the printer formatter program 320 has passed the integrity test. If the printer formatter program 320 fails the integrity test, then processing proceeds to step 718.

If the printer formatter program 320 passes the integrity test, then processing proceeds to step 734. In step 734, the printing software 410 checks the compatibility of the version of the printer formatter program to the version of the printing software 410. In decision block 738, a determination is made whether the compatibility test has been passed. If the compatibility test fails, then processing proceeds to step 744. In step 744, the printing software 410 instructs the user to perform a manual upgrade of the printer formatter program 320. If the compatibility test is successful, then in step 748 the printer controller ready data (PCRD) data stream is sent to the printer formatter 54.

Upgrade Module Operation

One aspect of the present invention is the provision of an upgrade module 430 that automatically or at user request connects to a source of more recent versions of the printer formatter program 320 and downloads the printer formatter program 320 to the printing software 410. The source can be, for example, an Internet web site of a developer of printer controller programs.

FIG. 7 is a flow chart illustrating the steps performed by the upgrade module of the system of FIG. 4 in accordance with one embodiment of the present invention. In step 800, a user purchases or chooses a printer feature update that is provided by a web site of the update provider. In step 804, the user downloads a feature update program from a web server 460. In step 808, the user runs the feature update program on the host 30. In step 814, the feature update program performs an integrity check (e.g., a CRC integrity check) of the new printer formatter program.

In step 818, the feature update program compares its PC card version with the connected PC card and office machine 40. In decision block 824, it is determined whether both the integrity and compatibility tests have been passed. If both tests have been passed, then in step 834 the feature update program stores the new printer formatter program 320 into the storage (e.g., non-volatile storage) in the host 30. In step 838 the feature update program installs the new printing software 410 on the host 30. Processing then continues to step 844 where normal printing resumes. Processing then proceeds to step 708 of FIG. 6.

In step 848 a user performs a print using printing software 228. In decision block 854, it is determined whether the host 30 is connected to the Internet. If the host 30 is not connected to the Internet, then no update is performed (step 864). Processing then proceeds to step 708 of FIG. 6.

If the host 30 is connected to the Internet, then in decision block 858, a determination is made whether an auto-update setting is on? If the auto-update setting is on, then in step 868 the printing software 410 compares the version of the printer formatter program 320 with the version of the most current printer formatter program residing on the web server 531 to determine if an update is needed.

In decision block 874, a determination is made whether a newer version of either the printer formatter program 320 or the printing software 410 is available. If a newer version of either is available, processing proceeds to step 878 where the newer version is downloaded. If a newer version of either is unavailable, no update is performed (step 864).

In step 878 the printing software 410 automatically downloads the feature update program from the web server 460. In step 884 the printing software 410 automatically runs the feature update program. Processing then continues to step 814.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method of printing in a system that includes an office machine having a print engine, a PC card for removably coupling to the office machine, the PC card having a printer controller and a memory for storing a printer controller program for execution by the printer controller, and a host having printing software, the method comprising:
   determining whether the PC card has been operationally coupled to the office machine;
   determining whether the printer controller program is loaded in the memory of the PC card;
   determining whether the printer controller program is valid;
   determining whether the printer controller program is compatible with the print engine and the printing software; and
   sending data to be printed to the printer controller if the PC card is determined to be operationally coupled to the office machine, the printer controller program is determined to be loaded in the memory, the printer controller program is determined to be valid, and the printer controller program is determined to be compatible with the print engine and the printing software.

2. The method of claim 1 further comprising:
   notifying a user if the printer controller program is one of not loaded into the memory, invalid, and incompatible with the print engine.

3. The method of claim 1 further comprising downloading an updated version of the printer controller program from a source external to the PC card to the printer controller if the printer controller has determined that the printer controller program is one of not loaded into the memory, invalid and incompatible with the print engine.

4. The method of claim 3 further comprising downloading the updated version of the printer controller program to the memory.

5. The method of claim 3 wherein the source is a web site.

6. The method of claim 1 wherein determining whether the printer controller program is valid further comprises performing a cyclic redundancy check on the printer controller program.

7. The method of claim 1 further comprising notifying a user to upgrade the printer controller if the printer controller program is incompatible.

8. The method of claim 7 further comprising loading a new printer controller program onto the PC card if the printer controller program is incompatible.

9. The method of claim 4 further comprising executing the updated version of the printer controller program in the printer controller.

10. A method of printing in a system that includes an office machine having a print engine for rendering images, a PC card slot coupled to the print engine for receiving a removable PC card, the PC card including a printer controller running printer controller firmware for controlling printer controller functions of the office machine, and a host running printing software, the method comprising:
    determining whether the printer controller firmware is compatible with the printing software;
    in response to determining that the printer controller firmware is compatible with the printing software, sending data to be printed to the printer controller; and
    in response to determining that the printer controller firmware is not compatible with the printing software:
      automatically downloading an updated version of the printer controller firmware from a source external of the PC card to the PC card;
      sending the updated version of the printer controller firmware in the printer controller of the PC card for execution by the PC card; and
      sending data to be printed to the printer controller.

11. The method of claim 10 further comprising notifying a user that updated printer controller firmware is required.

12. The method of claim 10 wherein verifying whether the printer controller firmware is compatible with the printing software comprises checking with the source external of the PC card whether a more current version of the printer controller firmware exists.

13. The method of claim 10 wherein the source external of the PC card further comprises a web server.

14. The method of claim 10 further comprising determining whether the printer controller firmware is loaded onto the PC card.

15. The method of claim 14 further comprising loading printer controller firmware onto the PC card if the printer controller firmware is not already loaded onto the PC card.

16. The method of claim 10 wherein the PC card further comprises a memory linked to the printer controller, wherein the memory stores the updated version of the printer controller firmware.

17. The method of claim 14 wherein the updated version of the printer controller firmware is downloaded to a memory of the PC card prior to execution by the printer controller.

18. The method of claim 10 further comprising performing a cyclic redundancy check on the printer controller firmware on the PC card.

19. A method of printing using an office machine having a print engine for rendering images, a PC card slot coupled to the print engine receiving a removable PC card, the PC card including a printer controller running printer controller firmware for controlling printer controller functions of the office machine, and a host running printing software, the method comprising:

communicating with a source external of the PC card and the host wherein the source includes a plurality of versions of the printer controller firmware;

determining whether the source includes a newer version of the printer controller firmware that is compatible with the printer controller on the PC card;

downloading to the host the newer version of the printer controller firmware from the source; and sending the newer version of the printer controller firmware to the PC card for installation in the printer controller; and sending data to be printed to the printer controller after the newer version of the printer controller firmware is sent to the printer controller.

20. The method of claim 19 further comprising notifying a user that updated printer controller firmware is required.

21. The method of claim 19 further comprising determining the type of printer controller present on the PC card that is received in the PC card slot.

22. The method of claim 21 further comprising receiving in the host information relating to the version of printer controller firmware required by the printer controller on the PC card.

* * * * *